Sept. 11, 1934.                    E. F. MULLER                    1,973,095
                              BELT CENTERING MECHANISM
                                Filed April 16, 1932

INVENTOR:
Ernst F. Muller
BY Chas. M. Niesen,
ATT'Y.

Patented Sept. 11, 1934

1,973,095

UNITED STATES PATENT OFFICE

1,973,095

BELT CENTERING MECHANISM

Ernst F. Muller, Columbus, Ohio, assignor to The Jeffrey Manufacturing Company, a corporation of Ohio Application April 16, 1932, Serial No. 605,658

28 Claims. (Cl. 198—202)

My invention relates to apparatus for automatically maintaining a belt of a belt conveyor in central position and one of the objects of the invention is the provision of improved and efficient mechanism for automatically maintaining a conveyor belt in central position in either direction of travel thereof.

Another object of the invention is the provision of belt centering mechanism for both the upper and lower runs of a belt conveyor.

A further object of the invention is the provision of frictional mechanism for automatically shifting belt centering mechanism upon reversal of travel of the belt.

Another object of the invention is the provision of belt centering mechanism for both the upper and lower runs of the conveyor belt and connections between said belt centering mechanisms to effect automatic reversal of both of them upon reversal of the belt conveyor.

Another object of the invention is the provision of improved and efficient means for reversing belt centering mechanism which shall operate also as belt cleaning apparatus.

A further object of the invention is the provision of improved and efficient belt cleaning mechanism operable upon movement of the belt in either direction and applied to the upper surface of the lower run of the belt to prevent material from being moved between the belt pulleys and the belt.

Other objects of the invention will appear hereinafter, the novel features and combinations being set forth in the appended claims.

In the accompanying drawing Fig. 1 is an elevational view of portions of a travelling belt conveyor with my improvements applied thereto;

Figure 5:
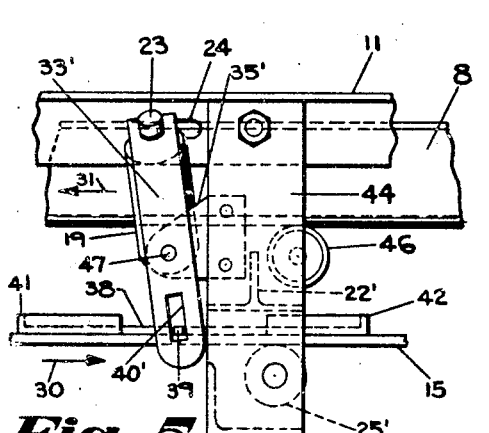
Figure 4:
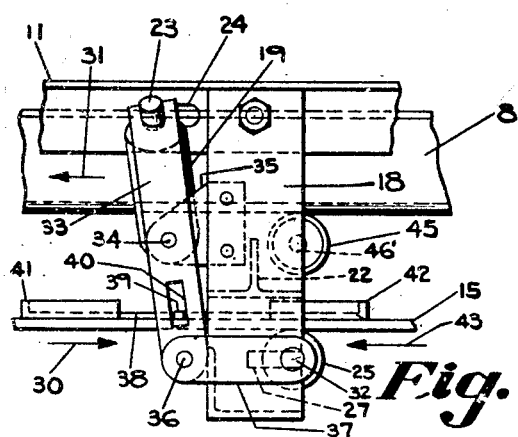
Fig. 4 is a side view of the structure shown in Fig. 3.

And Fig. 5 is a view similar to Fig. 4 but showing a modification by omitting belt centering mechanism for the lower run of the conveyor.

Figure 1:
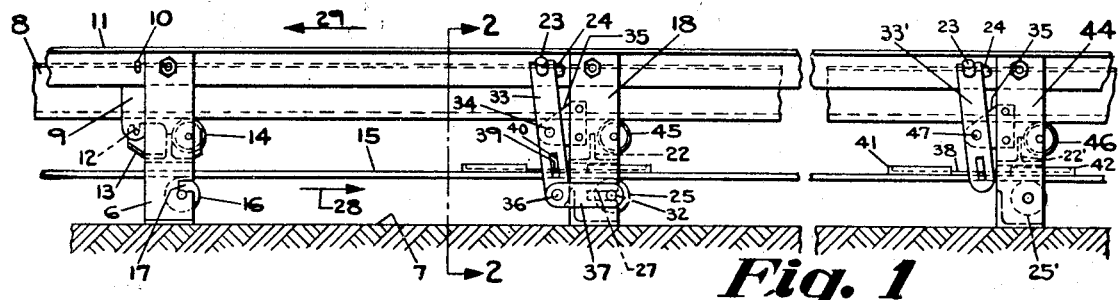

In Fig. 1 the travelling belt conveyor is shown as comprising a transverse H-shaped support 6 adapted to rest on the floor 7. The upper run 8 of the belt is supported in trough-shaped position by means of inclined rollers 9 journaled on shafts supported at their outer ends at 10 in vertical slots in the longitudinal angle irons 11, 11. At their inner ends the shafts of the rollers 9 are supported in the slots 12 in brackets 13. Between the spaced-apart brackets 13 are supported horizontal rollers 14 in position to contact with the bottom of the trough of the upper run 8.

The lower run 15 of the conveyor belt is adapted to rest on co-axial rollers 16, the outer ends of the shafts of which are supported in the slots 17 as shown in Fig. 1. It should be understood that supporting mechanism similar to that shown at the left-hand portion of Fig. 1 is provided at frequent intervals to properly support the load conveyed by the upper run 8 of the belt conveyor.

Intermediate the spaced-apart supports 6 are located at intervals the belt centering mechanisms comprising the U-shaped supports 18 to the upper ends of which are secured the longitudinal spaced-apart angle irons 11, 11. Spaced-apart rollers 19, 19 are journaled on the shafts 19', 19', the inner ends 20, 20 of which extend through openings in the angular brackets 21, 21. The latter are secured to the I-beam 22 the ends of which are secured to the U-shaped support 18 shown in Fig. 2.

It should be understood that the rollers 19 are mounted to rotate on the axles 19' the outer ends 23, 23 of which project through the longitudinal slots 24 in the vertical portions of the angle irons 11, 11. It will thus be seen that the lateral edges of the trough-shaped upper run 8 of the conveyor belt rest on the rollers 19, 19 intermediate the ends of the latter. By reason of the slots 24 the outer ends 23, 23 of the shafts of the rollers may slide along the angle irons 11, 11 to cause the rollers to be diverged forwardly relative to the inner ends 20, 20 in the direction of travel of the belt. The rollers will therefore each have a tendency to deflect the belt toward the opposite side. If the belt travels in the center of the frame comprising the U-shaped supports and the longitudinal angle irons 11, 11 the load on each outer roller 19 will be about the same. If the belt does not travel along the central longitudinal path desired, the load on one outer roller 19 will become greater than on the other and this difference in the roller load will provide the necessary force to lead the belt toward the center of the frame.

Figure 2:
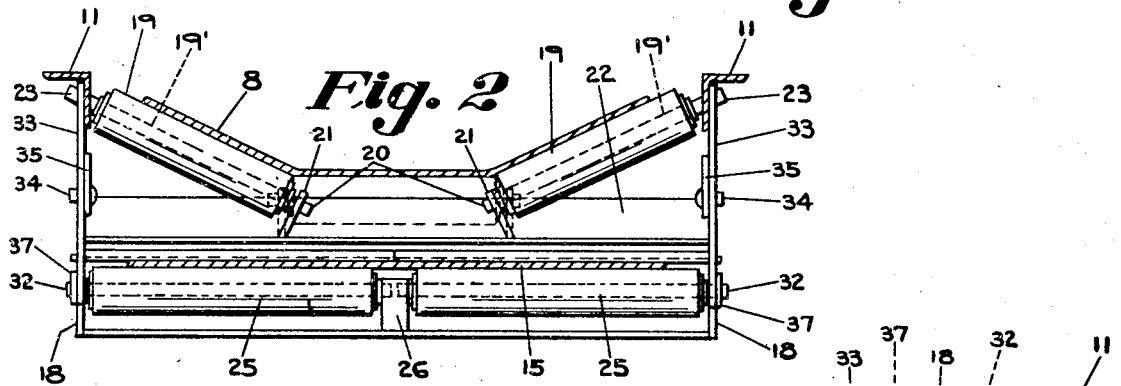
Fig. 2 is an enlarged sectional elevation taken on the line 2—2 of Fig. 1 looking in the direction of the arrows.
Figure 3:
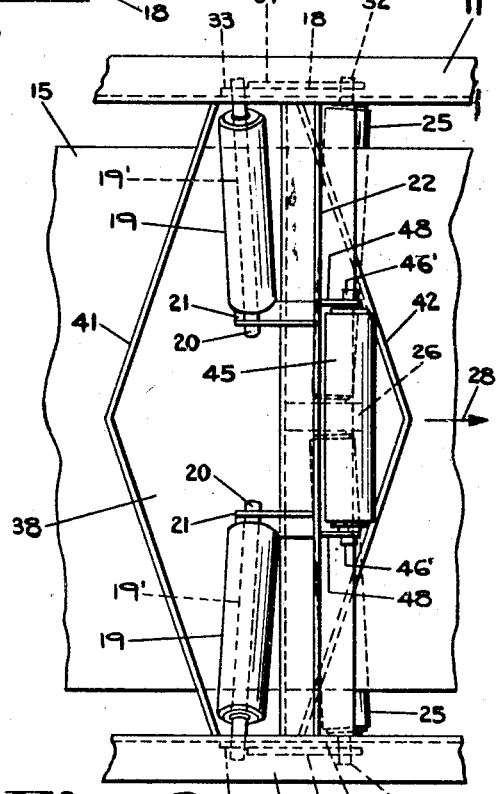
Fig. 3 is an enlarged plan view of a portion of the belt conveyor with the upper run removed and showing the belt centering mechanism for both runs of the conveyor combined with the belt cleaner and the shifting mechanism.

The same is also true with respect to the lower flat run 15 of the conveyor belt. The two rollers 25, 25 may have the inner ends of their shafts supported in the standard 26 as shown in Fig. 2 and their outer ends supported in horizontal slots one of which is shown in elevation at 27 in dotted lines in Fig. 4. When the lower run 15 of the belt travels in the direction of the arrow 28 as shown in Fig. 3 the outer ends of the rollers 25 diverge in the direction of the travel of the belt. At the same time the upper run 8 will be travelling in the opposite direction as indicated by the arrow 29 in Fig. 1 and such direction of travel will cause the upper rollers 19 to occupy the positions shown in Fig. 3. It will thus be seen that when the lateral edges of the belt rest on the rollers 19 the outer ends of their axles 19' are supported in the horizontal slots 24, so that the rollers will automatically occupy diverging relations in accordance with the direction of travel of the belt, the said outer ends being free to slide along said slots.

It should be observed that the longitudinal slots 24 in the angle irons 11, 11 are arranged symmetrically with respect to the holes in the inclined brackets 21 so that when the belt travels in one direction the rollers 19 will assume a diverging relation accordingly and when the belt travels in the opposite direction the diverging relation of the rollers 19 will be in the opposite direction. That is to say, a vertical plane extending transversely of the conveyor through the inner ends 20 will extend through the centers or midway between the ends of the slots 24. Likewise a vertical transverse plane extending through the inner ends of the shafts of the rollers 25 will pass through the slots 27 midway between the ends of the latter.

It will thus be seen that when lower run 15 of the belt travels in the direction of the arrow 30 as shown in Fig. 4 the rollers 25 will assume a diverging relation in the direction of the arrow 30, the outer ends of the rollers 25 being then located at the right-hand ends of the slots 27 in the vertical standards 18. The upper run of the belt will then be travelling in the direction of the arrow 31 which will cause the upper pair of rollers 19 to assume a diverging relation in the direction of travel of the upper run of the belt, the ends 23 then being located at the left-hand ends of the slots 24 as viewed in Fig. 4.

When the belt is reversed to travel in a direction opposite to that indicated by the arrows 30 and 31 the rollers 25 and 19 will be shifted to reversed diverging positions. That is to say, when the lower run 15 is reversed to travel in the direction opposite to that indicated by the arrow 30 the rollers 25 will assume a diverging relation in the direction of travel of the belt and the ends 32 at the outer ends of the rollers 25 will move to the left-hand ends of the slots 27 as viewed in Fig. 4. Likewise, when the upper run 8 is reversed the ends 23 will slide to the right-hand ends of the slots 24 and the rollers will assume a diverging relation in the direction of travel of the belt. It should be understood that when the rollers assume a diverging relation in the direction of travel of the belt they will act automatically to center the belt in the supporting framework.

In order to more positively effect shifting of the rollers 19 and 25 when the belt is reversed I have provided levers 33, 33 on opposite sides of the conveyor apparatus. The levers 33 are pivoted at 34, 34 to brackets 35, 35. The upper ends of the levers 33 are provided with openings or perforations which fit loosely over the ends 23, 23. The lower ends of the levers 33 are pivoted at 36 to links 37, 37 the right-hand ends of which as viewed in Fig. 4 are provided with openings or perforations which fit losely over the pins 32. It will thus be seen that when reversal of the belt automatically reverses the diverging positions of one set of rollers under one run of the belt the other set of rollers will also be changed into diverging positions in accordance with the direction of travel of the belt.

The main purpose of the connecting links 33, however, is to enable frictionally operable mechanism to positively change the diverging positions of the rollers 19 and 25 when the belt is reversed. This frictionally operable mechanism comprises a plate 38 which rests on the upper surface of the lower run 15 of the belt. The plate 38 is provided with laterally projecting pins 39 which extend into upright slots 40 in the upright levers 33, as shown in Figs. 1 and 4. It can readily be seen by referring to Fig. 4 that when the lower run of the belt 15 travels in the direction of the arrow 30 the pins 39 in the slots 40 act to move the lever 33 on the pivot 34 with the lower end of the lever projected toward the right and the upper end thereof projected toward the left. During the operation of the conveyor, the belt 15 continues to slide under the plate 38 and the constantly applied friction to the latter will act to postively hold the rollers 19 and 25 in diverging relation to the direction of travel of the belt. If the direction of travel of the belt is reversed the plate 38 will be frictionally operated to positively shift the outer ends of the rollers 19 and 25 to the opposite ends of the slots 24 and 27 and positively hold the rollers in such positions during continued operation of the belt conveyor.

For the purpose of strengthening the plate 38 and obtaining scraping edges, vertical flanges are provided at 41 and 42. These flanges are preferably V-shaped when viewed in plan as shown in Fig. 3 so as to deflect from the sides of the conveyor belt 15 such loose material as may fall thereon. When the belt 15 travels in the direction of the arrow 28 the flange 41 acts to scrape and deflect foreign material from the upper surface of the belt 15. When the conveyor travels in the opposite direction the opposite flange 42 acts to scrape foreign material from the belt and deflect it off the sides or edges thereof. The frictionally operable reversing apparatus for the centering mechanism therefore also acts to clean the upper surface of the lower run of the belt and prevent foreign material from passing between the belt and the rollers or drums at the ends of the conveyor apparatus.

Mounted on each of the supports 6, 18 and 44 as shown in Fig. 1 is a center transverse roller for supporting the horizontal portion of the trough-shaped upper run 8 of the conveyor belt. The horizontal transverse supporting roller is designated 14 at the left-hand end of Fig. 1, 45 in the center thereof and 46 at the right-hand end. As shown in Fig. 3 the ends 46', 46' of the shaft on which the roller 45 is journaled, are supported in openings in the brackets 48, 48 mounted on the I-beam 22.

In the modification shown in Fig. 5 the links 37 and the slots 27 shown in Fig. 4 have been omitted and the lower horizontal supporting rollers 25' have the outer ends of their shafts supported in circular perforations in the supporting standards 44. The upper ends of the levers 33' are provided with openings which fit loosely over the ends 23 of the shafts of the rollers 19. The levers 33' are pivoted at 47 to the brackets 35'. The lower arms of the levers 33' are provided with slots 40' into which are adapted to extend the pins 39 at the lateral ends of the friction plate 38.

Fig. 4 shows centering mechanism for both runs of the belt but in Fig. 5 I have shown centering mechanism for only the upper run of the belt, but in both forms the friction mechanism operates automatically to positively shift the upper belt centering mechanism to diverging relation in the direction of travel of the upper run of the belt when the belt travel is reversed.

The conveyor structure to which my belt centering mechanism and belt cleaning mechanism are particularly adapted as shown in the accompanying drawing, is claimed in the co-pending application of Nils D. Levin, Serial No. 664,780, filed April 6, 1933, for an Improvement in material handling mechanism.

It should be particularly understood that the belt centering mechanism shown at the central portion of Fig. 1 and at the right-hand portion thereof is not intended to be used at each of the supporting standards for the conveyor apparatus. Between the standards 18 and 44, as indicated by the broken ends of the angle irons 11, 11 and the belt runs, a plurality of the H-shaped standards 6 may be used. For instance, in some instances one of the centering devices may be located at such intervals that they will be spaced apart from 100 feet to 150 feet.

It will be observed that the cross-pieces 22, 22' are positioned above the scraper and adjacent thereto for holding the scraper continuously in scraping engagement with the belt. Otherwise, in the event of there being a large mass of material on the belt, there might be a tendency for the scraper to ride over such material without dislodging the same. The tendency is prevented by engagement of the scraper with the cross-piece, the scraper being thereby pressed against the belt, assuring dislodgement of all material from the belt.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. In conveyor apparatus, the combination with a belt, of supporting framework therefor, belt centering mechanism comprising supports for opposite edges of the upper run of the belt and diverging in the direction of travel of said upper run, additional belt centering mechanism comprising supports for opposite edges of the lower run of the belt and diverging in the direction of travel of said lower run, and means operated automatically by reversal of said belt for reversing both of said centering mechanisms.

2. In conveyor apparatus, the combination with a reversible belt centering mechanism for the upper run of a conveyor, of a reversible belt centering mechanism for the lower run of the conveyor, and means operable by reversal of the travel of the belt for reversing both of said centering mechanisms.

3. In conveyor apparatus, the combination with a reversible belt conveyor, of belt centering mechanism comprising belt edge rollers on diverging axes, a double V-shaped scraper plate on the upper side of the lower run of the belt, and connections between said plate and said belt centering mechanism to shift the outer ends of said rollers to change the divergence of said rollers when the belt conveyor is reversed.

4. In centering mechanism for belt conveyors, the combination with a frame having upper side members provided with vertical plates, of belt edge rollers for supporting said belt and comprising inclined axles, and inclined bracket plates having holes for receiving the lower inner ends of said axles, the outer ends of said axles extending through unobstructed horizontal slots in said vertical plates.

5. In centering mechanism for belt conveyors, the combination with a frame having longitudinal unobstructed slots in the sides thereof, of belt edge rollers and comprising inclined axles, and supports for the inner ends of said axles, said supports having holes for receiving said axles in a transverse vertical plane extending through said slots intermediate the ends thereof, and the outer ends of said axles being free to slide along said slots upon reversal of travel of said belt.

6. In centering mechanism for belt conveyors, the combination with a frame comprising top angle irons having longitudinal unobstructed slots in the vertical flanges thereof, of rollers for supporting the edge portions of the belt, and bracket plates having holes therein in a vertical plane extending through said holes and said slots midway the length of the latter, said rollers having axles the inner ends of which fit in the holes of said bracket plates and the outer ends of which are freely slidable along said slots.

7. The combination with a reversible belt conveyor, of centering mechanism therefor, and means connected to said centering mechanism and operable by the lower run of the conveyor belt to reverse the centering mechanism when the travel of the belt is reversed.

8. In conveyor apparatus, the combination with a reversible belt conveyor, of belt centering mechanism comprising rollers having shafts for supporting the same under the edges of the belt on diverging axes, a transverse scraper continuously in contact with one of the surfaces of said belt, and connections between said scraper and said belt centering mechanism to shift the outer ends of said shafts to change the divergence of said rollers when the belt conveyor is reversed.

9. In conveyor apparatus, the combination with a reversible belt conveyor, of belt centering mechanism comprising rollers having shafts for supporting the same under the edges of the belt on diverging axes, a scraper extending entirely across said belt, and connections between said scraper and said belt centering mechanism to shift the outer ends of said shafts to change the divergence of said rollers when the belt conveyor is reversed.

10. In conveyor apparatus, the combination with a reversible belt conveyor, of belt centering mechanism comprising belt edge rollers supported on diverging axes, a scraper continuously in contact with the belt and operable to scrape material therefrom during travel of the belt in either direction, and connections between said scraper and said belt centering mechanism to shift the divergence of said rollers when the belt conveyor is reversed.

11. In conveyor apparatus, the combination with a belt conveyor comprising a supporting frame, a floating scraper resting on the upper side of the lower run of said belt, reversible belt centering mechanism for the upper run of the conveyor, and means comprising pin and slot connections between said scraper and said belt centering mechanism for reversing the latter when the belt conveyor is reversed.

12. In conveyor apparatus, the combination of a belt conveyor comprising a supporting frame having longitudinal side bars, and belt centering mechanism comprising belt edge supporting rollers each journalled in a hole of said frame at its inner end and in an unobstructed longitudinal slot in said side bars at its outer end.

13. In conveyor apparatus, the combination with a belt, of supporting framework therefor, belt centering mechanism comprising supports for opposite edges of the upper run of the belt and diverging in the direction of travel of the upper run, additional belt centering mechanism comprising supports for opposite edges of the lower run of the belt and diverging in the direction of travel of the lower run, shifting connections between the said belt centering mechanisms, and means operated automatically by reversal of travel of the said belt for actuating the said connections to effect reversal of both of the said belt centering mechanisms.

14. In conveyor apparatus, the combination with a belt, of supporting framework therefor, belt centering mechanism comprising supports for opposite edges of the upper run of the belt, the said supports being shiftable at their outer ends longitudinally of the framework to diverge in either direction of travel of said upper run of the belt, additional belt centering mechanism comprising supports for the opposite edges of the lower run of the belt with the outer ends of said supports being shiftable longitudinally of the said framework to diverge in either direction of travel of the said lower run of the belt, mechanical connections between the said supports on opposite sides of the said framework, and means operated automatically by reversal of travel of the said belt to actuate the said mechanical connections to reverse both of the said centering mechanisms.

15. In conveyor apparatus, the combination with a belt, of supporting framework therefor, rollers projecting laterally from opposite edges of the upper run of the said belt, bearing shafts one for each roller, means for supporting the said shafts on the said framework with their outer ends slidable longitudinally of the framework to support the said rollers on axes downwardly and inwardly inclined from the outer edges of the said belt and for occupying positions diverging in the direction of travel of the upper run of the belt, additional rollers projecting from the lateral edges of the lower run of the belt, bearing shafts one for each of the lower rollers with the outer ends of said shafts slidable longitudinally of the said framework to support the lower rollers to diverge in the direction of travel of the lower run of the belt, mechanical connections between the outer ends of the said shafts on opposite sides of the said framework, and means operable by reversal of the belt for shifting the said mechanical connections to secure reversal of the divergence of the lower rollers.

16. In conveyor apparatus, the combination with a reversible belt centering mechanism for the upper run of a conveyor, of a reversible belt centering mechanism for the lower run of the conveyor, mechanism connecting the said belt centering mechanisms, and means operable by reversal of the travel of the said belt to actuate the said connecting mechanism to effect reversal of both of the said centering mechanisms.

17. In conveyor apparatus the combination with a reversible belt conveyor, of reversible belt centering mechanism, and means frictionally engaged by the said belt and connected to the said belt centering mechanism to reverse the same when the said belt conveyor is reversed.

18. In conveyor apparatus, the combination with a belt conveyor comprising a supporting frame, of a V-shaped floating scraper resting on the upper surface of the lower run of the belt, pins projecting laterally from the said scraper, and means mounted at the lower sides of the said frame to afford upright slots for receiving the said laterally projecting pins to confine the scraper against longitudinal movements but permitting limited up and down movements of the said scraper relatively to the said frame.

19. In conveyor apparatus, the combination with a reversible belt conveyor, of belt supporting means for the conveyor, a scraper for the said conveyor operable during travel of the said conveyor in either direction and continuously in scraping contact with the said belt, and a crosspiece on the said frame spaced above the said belt supporting means and above the said scraper and adjacent to the latter for continuously holding the scraper in scraping engagement with the belt.

20. In a belt conveyor, the combination with a supporting frame comprising elongated longitudinally extending parallel spaced apart vertical plates having longitudinal horizontal slots therein, of a belt, rollers for supporting the belt for travel along the frame between the longitudinally extending vertical plates, shafts on which said rollers are journalled, and means for supporting the inner ends of the said shafts on the said frame with their outer ends projecting into the said longitudinal horizontal slots for supporting the rollers on diverging axes relative to either direction of the travel of the belt, the said slots being free and unobstructed to permit automatic sliding of the outer ends of said shafts along such slots when the direction of travel of the belt is reversed.

21. In a belt conveyor, the combination with a supporting frame having elongated angle irons at the upper lateral edges thereof, of a conveyor belt, rollers for supporting said belt, shafts for rotatably supporting said rollers, and means for supporting the said shafts on the said frame with the outer ends of the said shafts free to slide along longitudinal slots in the said angle irons to effect an automatic pitching forward of the outer ends of the said rollers in the direction of travel of the belt when the direction of such travel is reversed.

22. In a belt conveyor the combination with a supporting frame comprising elongated vertical plates with longitudinal horizontal slots therein, of a traveling belt, rollers mounted at the edges of said belt for supporting the same, shafts on which the said rollers are journalled, and spaced-apart bracket plates having openings for receiving the inner ends of the said shafts, the outer ends of the said shafts being freely slidable along the said slots in either direction from a vertical plane extending transversely through the said openings and points intermediate the ends of the said slots.

23. In centering mechanism for belt conveyors, the combination with a supporting frame comprising elongated top side members having elongated vertical plates, of a traveling belt, means comprising belt edge rollers for supporting said belt, and mechanism comprising shafts rotatably supporting the said rollers and extending into longitudinal slots in the said vertical plates for effecting automatic shifting of the diverging axes of said rollers relative to the longitudinal length of the said frame.

24. The combination with a reversible belt conveyor, of means for supporting the belt comprising edge rollers, mechanism for supporting the said rollers for automatic shifting of their axes to positions diverging in the direction of travel of the belt when such direction is reversed, actuating levers at the sides of the conveyor and connected to the outer ends of the said mechanism for supporting the said edge rollers, a plate adapted to rest on the lower run of the said belt, and connections between the said plate and the lower ends of the said levers to actuate the latter.

25. In conveyor apparatus, the combination with a reversible belt conveyor, of belt centering mechanism comprising belt edge rollers on diverging axes, a plate on the upper side of the lower run of the belt, and connections between the said plate and the belt centering mechanism to change the divergence of the said rollers when the belt conveyor is reversed.

26. In conveyor apparatus, the combination with a reversible belt conveyor, of belt centering mechanism comprising belt edge rollers on diverging axes for the upper run of the belt, additional belt centering mechanism comprising belt edge rollers on diverging axes for the lower run of the belt, an actuating device resting on the upper side of the lower run of the belt, and connections between the said actuating device and both of the said belt centering mechanisms to shift the outer ends of all of the said rollers to change the divergence of the upper rollers and the divergence of the lower rollers when the belt is reversed.

27. In conveyor apparatus, the combination with a reversible belt conveyor, of belt centering mechanism comprising belt edge rollers on diverging axes, belt cleaning mechanism on the upper side of the lower run of the belt, and connections between the belt cleaning mechanism and the said belt centering mechanism to automatically change the divergence of the said rollers when the belt conveyor is reversed.

28. In conveyor apparatus, the combination with a conveyor belt, of a supporting frame, rollers on fixed horizontal transverse axes for supporting the lower run of the conveyor belt, troughing roller supports for the upper run of the conveyor belt comprising a central roller on a fixed horizontal transverse axis and belt edge rollers mounted on upwardly and laterally extending axes diverging in the direction of travel of the belt, an actuating device engaged by the lower run of the belt, and connections between the said actuating device and the outer ends of the edge rollers to shift the same along horizontal longitudinal slots in the said frame to change the divergence of the said inclined axes upon reversal of direction of travel of the said belt.

ERNST F. MULLER.